UNITED STATES PATENT OFFICE.

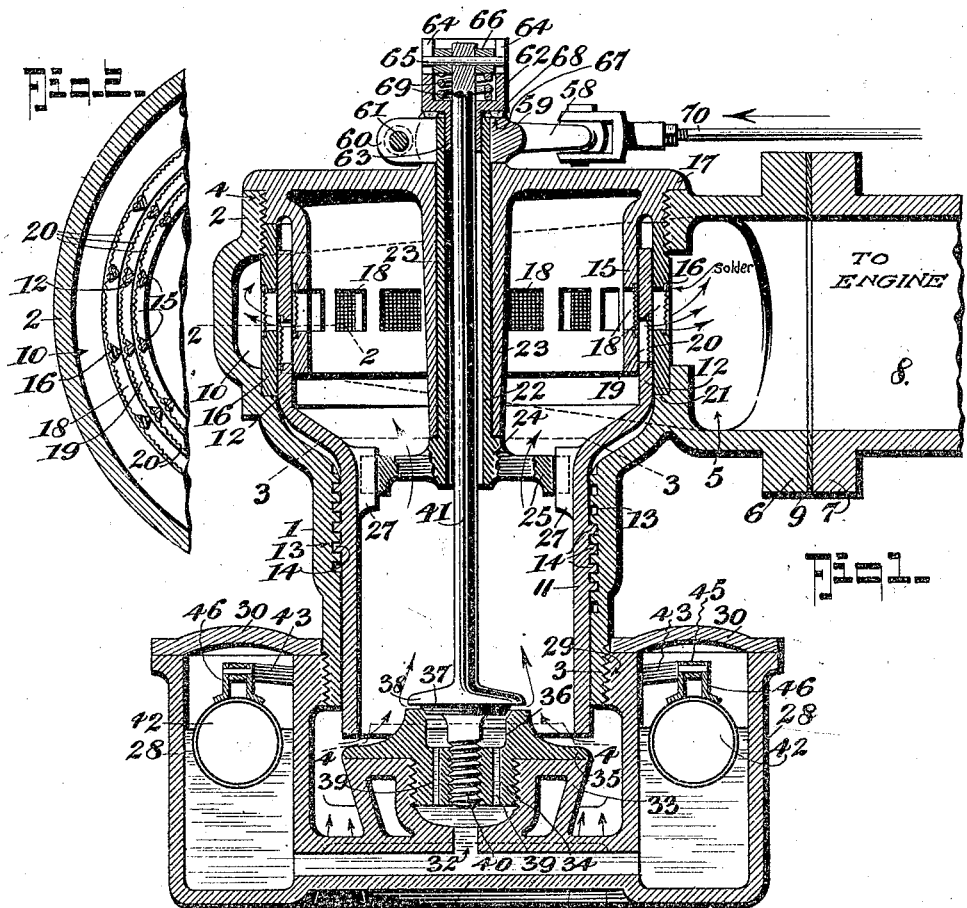
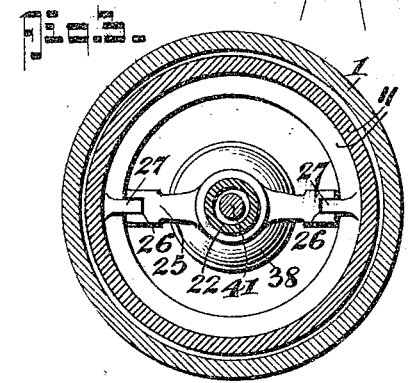
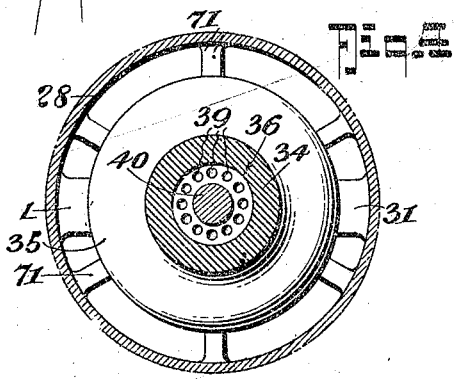

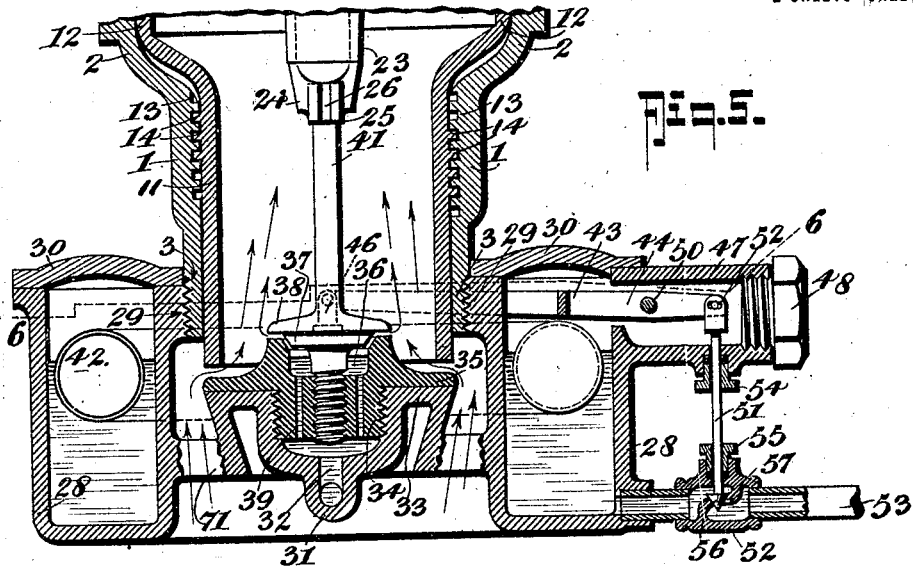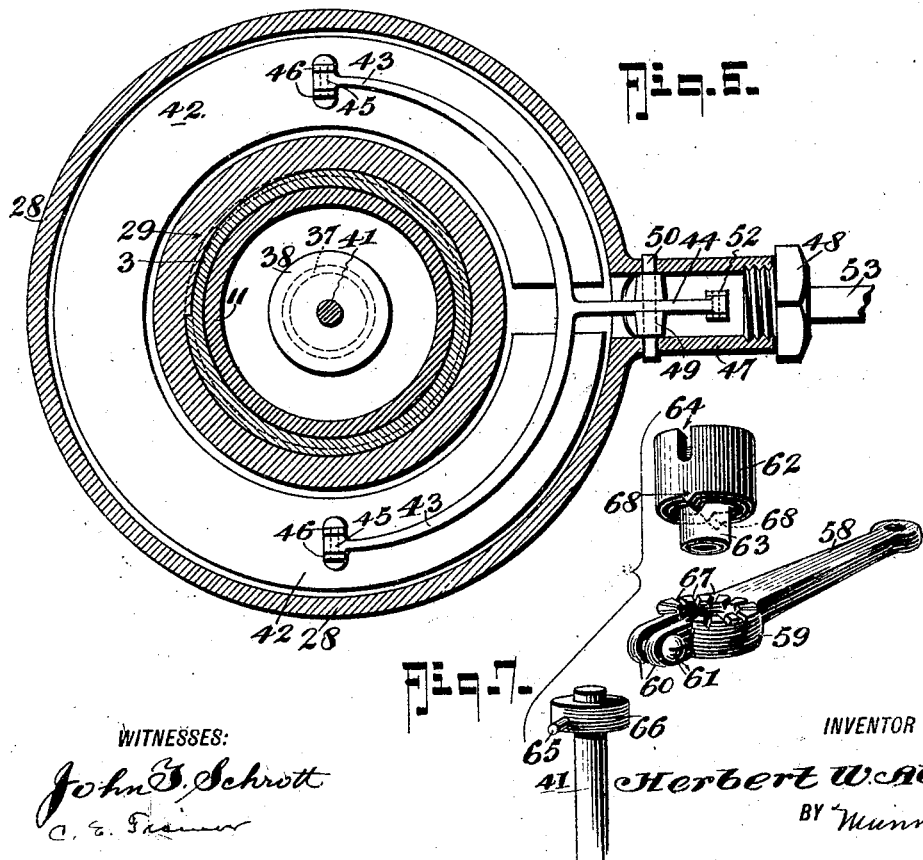

HERBERT W. ALLEN, OF COALINGA, CALIFORNIA.

CARBURETER.

1,185,574.  Specification of Letters Patent.  Patented May 30, 1916.

Application filed May 25, 1915. Serial No. 30,274.

*To all whom it may concern:*

Be it known that I, HERBERT W. ALLEN, a citizen of the United States, and a resident of Coalinga, in the county of Fresno and State of California, have invented certain new and useful Improvements in Carbureters, of which the following is a specification.

My invention is an improvement in carbureters, and the invention has for its object to provide a device of the character specified, wherein the carbureter is provided with valves for controlling the inlet of air and fuel, together with the mechanism for permitting the said valves to be simultaneously controlled, and so arranged that they may be adjusted with respect to each other independently, and wherein the carbureter is provided with other mechanism for thoroughly and intimately mixing the charge to provide a uniform homogenous mixture.

In the drawing, Figure 1 is a vertical section of the improved carbureter, with the parts in position for slow running; Fig. 2 is a cross section on the line 2—2 of Fig. 1; Figs. 3 and 4 are sections on the lines 3—3 and 4—4, respectively, of Fig. 1; Fig. 5 is a partial vertical section at right angles to Fig. 1; Fig. 6 is a section on the line 6—6 of Fig. 5; and Fig. 7 is a perspective view showing the clutch mechanism with the parts separated.

The embodiment of the invention shown in the drawings comprises an outer casing consisting of integral portions 1 and 2 of unequal diameter, the portion 2 being of greater diameter than the portion 1, and the said portions are co-axial, the portion 2 being simply an enlargement of the portion 1. It will be noted that the two portions merge gradually into each other, and the portion 1 is externally threaded at its lower end as indicated at 3, while the portion 2 is internally threaded at its upper end, as indicated at 4.

The portion 2 has a lateral nipple 5, and this nipple has a marginal flange or rib 6, which is adapted to abut against a similar rib 7 on a pipe 8 leading to the engine, and a gasket or packing ring 9 is arranged between the flanges for making a fluid tight joint.

It will be noted from an inspection of Fig. 1, that the portion 2 is provided intermediate its ends with an internal annular enlargement 10, the said enlargement extending entirely around the said portion. A two-part sleeve is arranged within the outer casing, the said sleeve comprising integral portions 11 and 12 of unequal diameter, the portion 12 being of greater diameter than the portion 11, and the said portions are integral as shown. The portion 1 in the outer casing has an internal coarse thread 13 near its connection with the portion 2, and the portion 11 of the sleeve has a similar external thread 14 engaging the thread 13 and coöperating therewith, to move the sleeve longitudinally with respect to the casing when the sleeve is rotated in the casing.

The upper or large portion 12 of the sleeve is adapted to fit roughly within the portion 2 of the outer casing, and thus said portion 12 fits between inner and outer flanges 15 and 16 arranged within the portion 2 of the casing, and connected to a head 17 which fits against the upper end of the portion 2 of the outer casing. The outer flange 16 is externally threaded at its connection with the head to engage the threaded portion 4 of the outer casing.

The flanges 15 and 16 are spaced apart from each other a sufficient distance to receive the portion 12 of the sleeve between the same, and the said flanges 15 and 16 have annular series of registering ports 18. The portion 12 of the sleeve has an annular series of ports 19, which are adapted to register with the ports 18 when the sleeve is at the end of its movement toward the head 17, and to be out of register or almost out of register with the ports 18 when the valve or sleeve is at the end of its movement in the opposite direction. Each of the ports 18 and 19 is covered by a screen 20, of suitable mesh, the said screen being held in place in any suitable manner, and it will be noted that the ports 18 are at the enlargement 10 of the portion 2 of the outer casing.

The flange 16 extends beyond the flange 15, and the lower or inner edge of the said flange fits against an annular shoulder 21, formed by counter-boring the portion 2 of the outer casing on the inner side of the enlargement 10. This flange 16 forms a closure between the enlargement 10 and the body of the inner casing, and the only communication between the said space 10 and the interior of the valve 11—12 is by way of the ports 18 and 19.

The valve or sleeve 11—12 is moved longitudinally of the casing 1—2, by turning the said valve in the casing. The coöperating threads 13 and 14 will move the valve longitudinally with respect to the casing when the valve is turned, and the valve is turned by means of a tubular shaft 22, which is journaled within a hub 23 integral with the head 17, and extending inwardly around the tubular shaft 22. This shaft 22 has an annular outwardly facing shoulder 24 near its lower end, and the inner end of the hub 23 abuts against this shoulder. The shaft 22 is oscillated in a manner to be presently described, and said shaft has a slidable connection with the valve, for constraining the valve to rotate with the shaft. This connection is by way of oppositely extending arms 25, each of which is vertically slotted at its outer end or forked, as indicated at 26, and ribs or vanes 27 extending inwardly from the valve are received in the slots.

It will be evident that when the shaft 22 is rotated, the arms 25 by their engagement with the ribs 27 will rotate the valve 11—12 therewith, and because of the threaded engagement between the valve and the casing the valve will be moved longitudinally of the casing. When the valve is so moved, the ports 19 of the valve will be brought more or less into register with the ports 18 of the flanges to permit a greater or less amount of mixture to pass from the interior of the valve to the annular passage 10 and from thence to the engine.

A fuel chamber in the form of an annular casing 28 is connected with the lower end of the portion 1 of the casing 1—2, the said casing being internally threaded at its upper end, as indicated at 29, to engage the threads 3 of the casing 1—2.

A cover 30 is provided for the casing, and the said casing has a diametrical tubular connection 31, through which the fuel may pass from one side of the casing to the other. This passage or tubular connection 31 communicates by a port 32 with the interior of a valve casing 33 which is arranged at the axis or center of the fuel chamber. This casing is internally threaded for engagement by the body portion 34 of a spray valve seat, and the said seat has a marginal flange or rib 35 extending outwardly to the outer surface of the casing 33. This casing has a hollow or double wall, as shown, and the passage or port 32 opens at the center of the casing. There is a space between the periphery of the casing 33 and the internal surface of the casing 28, to permit the passage of air up around the valve casing and between the same and the casing 28 into the lower end of the valve 11—12. The said lower end is open, and the rib 35 of the valve seat is of the same diameter as the portion 11 of the valve, so that the periphery of this portion of the valve is flush with the periphery of the rib 35.

The upper end of the valve seat is recessed as shown at 36, and at the top of the recess the seat is beveled, to coöperate with the beveled portion 37 of a valve. The beveled portion 37 of the valve is inclined at the same angle as the beveled upper end of the recess, so that when the valve is at its lowest point the beveled surfaces will abut to close the opening between the recess and the interior of the valve 11—12.

The valve has a rib 38 extending beyond the beveled surface 37 and adapted to contact with the upper end of the seat, when the valve is at its lowest point, and the interior of the casing 33 communicates with the recess 36, by means of passages or ports 39 through the seat.

It will be noted upon an inspection of Fig. 4, that there is an annular series of these openings or passages, and that the series encircle an internally threaded opening, which is engaged by a depending threaded stem 40 extending axially from the valve 37—38. The valve is also provided with an upwardly extending axial stem 41, which passes through the tubular shaft 22 and the hub 23 to a point above the upper end of the said tubular shaft.

A float 42 is arranged within the fuel chamber 28, the said float being in the form of a hollow split ring, and the float is pivoted at diametrically opposite points to the arms 43 of a yoke comprising the said arms and a body 44. The arms 43 of the yoke form a continuous arc-shaped member, having at each end a bearing lug 45, which is received between a pair of bearing lugs 46 on the upper surface of the float, and a pivot pin is passed through each pair of lugs and the adjacent bearing.

The body 44 of the yoke extends beyond the ring at the split, and into a nipple 47 extending radially from the fuel casing, the outer end of the nipple being normally closed by a plug 48. Intermediate its ends the body of the yoke is provided with a transverse hub 49, which fits upon a journal pin 50 arranged diametrically of the nipple 47, and the yoke is thus mounted to swing on the journal pin.

A link 51 is pivoted at its upper end to the outer end of the body 44 of the yoke, with a pin and slot or lost motion connection, indicated at 52, and the link extends downwardly through the wall of the nipple into a valve casing 52 interposed in the length of the supply pipe 53 which conducts the fuel to the fuel chamber, opening at the bottom of said chamber, as shown.

Stuffing boxes 54 and 55 are arranged in the wall of the nipple and in the top of the valve casing through which the link 51 passes, and the lower end of the link carries a conical valve 56, which coöperates with a similar valve seat in a diaphragm 57 extending transversely of the valve casing. The valve 56 controls the admission of the fuel to the fuel chamber, and the valve is controlled directly by the float 42.

It will be evident that when the float is lifted, the outer end of the body of the yoke will move downward, moving the link 51 downward, which is the stem of the valve 56, and the valve will be closed or partially closed to shut off the supply of fuel. When the float moves downwardly, the valve will be opened.

A handle 58 is connected to the upper end of the tubular shaft 22, the said handle having a split bearing 59 which fits over the upper end of the shaft. The ends of the bearing have radial lugs 60 which are engaged by a set screw 61, by means of which the lugs may be moved toward or from each other to clamp the split bearing on the shaft, or to release the bearing from the shaft.

A cup-shaped member 62 is arranged at the top of the shaft, the cup-shaped member having a depending hub portion 63 which fits within the shaft, between the upper end of the valve stem 41 and the interior of the shaft. At its top, the cup-shaped member 62 is provided with oppositely arranged longitudinally extending slots 64, and these slots are engaged by a cross pin 65 arranged transversely of the top of the stem 41, and it will be noted that a ring 66 is secured to the top of the stem by means of the cross pin, said ring being a smooth fit within the cup-shaped member, and filling the space between the interior thereof and the exterior of the valve stem 41.

The upper face of the split bearing 59 has an annular series of radial notches 67, which are adapted to be engaged by teeth 68 on the lower end of the cup-shaped member 62. The teeth 68 are two in number and at diametrically opposite points, and these teeth are shaped to fit and fill the notches 67.

A coiled spring 69 is arranged within the cup-shaped member between the ring 66 and the bottom of the cup shaped member, and this spring acts normally to press the valve stem 41 and the valve 37—38 upward. The handle 58 is connected by means of a link 70 to suitable operating mechanism, (not shown) for moving the said link longitudinally to swing the arm or handle 58 in a direction to open or close the valve 37—38.

The operation of the improved carbureter is as follows: The fuel may pass freely from the fuel chamber 28 by way of the diametrical passage 31 and the port 32 to the interior of the valve casing 33 and by way of the ports 39 to the recess or well 36. When the valve 37—38 is opened, the air rushing in through the annular fuel chamber 28 will pass upward around the casing 33, and over the rib 35 into the lower end of the valve 11—12. This air as it passes over the space between the valve 37—38 and the top of the seat will take up a portion of the fuel, and will carry it on up through the valve 11—12 and through the openings or ports 18—19, to the annular passage 10, and from thence to the engine.

It will be noted that the valve casing 33 is connected to the interior or inner surface of the casing 28, by radial arms 71, and these arms are spaced apart a sufficient distance to provide a free flow of air to the interior of the valve 11—12. The level of the fuel in the well or recess 36, will depend upon the level in the chamber 28, and this level is maintained at a predetermined point by the float valve. Hence there will be at all times a fixed level of the fuel in the aspirating well 36. This air following the course of the arrows in Figs. 1 and 5, and charged with the fuel, passes to the engine, being thoroughly mixed and made homogeneous by its passage through the screens 20 in the ports 18 and 19. Whenever the piston of the engine moves in one direction, a partial vacuum is created in the pipe 8, and the air will rush through the valve 11—12.

The valves 37—38 and 11—12 are operated in unison. The said valves are suitably adjusted, independently of each other, by releasing the handle 58 from the stem. This is done by lifting the cup-shaped member, the spring 69 permitting the said member to be lifted to bring the teeth 68 out of engagement with the notches 67. With the cup-shaped member disengaged from the handle 58 the valve 11—12 may be turned to provide for the proper amount of opening between the inner end of the said valve and the rib 35. The stem 41 is adjusted to secure the proper opening between the valve 37 and the aspirating well, after which the teeth of the cup-shaped member are permitted to engage with the notches 67. When now, the handle 58 is moved in either direction, the valves 37—38 and 11—12 operate in unison. It will be noted from an inspection of Fig. 2 that those portions of the sleeves and the valve between the openings 18 and 19 are beveled at the inner faces of the sleeves and valves. The said portions which are in fact bridges between the openings are triangular in cross section and have their apices inward. This arrangement permits a full opening of the ports at all positions of the valve and the sleeves. All of the screens it will be noted are let into rabbets which extend entirely around the openings and they may be soldered in place if desired.

I claim:

1. A carbureter, comprising concentric inner and outer casings, an annular fuel chamber connected to the outer end of the outer casing outside of the same, said chamber having a fuel well at the axis of the casing and connected to the chamber, a valve seat in the well and having an aspirating well in its top and having passages leading to the fuel well, the inner casing being adapted to fit at its inner end against the seat to close the said inner casing, a valve fitting the aspirating well and having a stem extending beyond the inner end of the casings, said casings having a threaded engagement for constraining one of them to move longitudinally with respect to the other when the inner casing is turned in either direction, a tubular shaft encircling the stem and having a sliding engagement with the inner casing for constraining the said casing to rotate with the shaft, a radial arm connected to the tubular shaft for turning the said shaft, releasable clutch mechanism between the said arm and stem for constraining the stem to turn with the tubular shaft, the outer casing having an outlet for the mixture at its inner end, and means in connection with the casings for varying the flow of the mixture to the outlet and for thoroughly mixing the same, said means comprising guide flanges on the outer casing concentric with the casings and spaced apart from each other and having registering ports, the inner casing extending between the flanges and having ports adapted to register with the ports of the flanges when the inner casing is moved in one direction and to move out of register with the said ports when the inner casing is moved in the opposite direction, and a screen in each port.

2. A carbureter, comprising concentric inner and outer casings, an annular fuel chamber connected to the outer end of the outer casing outside of the same, said chamber having a fuel well at the axis of the casing and connected to the chamber, a valve seat in the well and having an aspirating well in its top and having passages leading to the fuel well, the inner casing being adapted to fit at its inner end against the seat to close the said inner casing, a valve fitting the aspirating well and having a stem extending beyond the inner end of the casing, said casings having a threaded engagement for constraining one of them to move longitudinally with respect to the other when the inner casing is turned in either direction, a tubular shaft encircling the stem and having a sliding engagement with the inner casing for constraining the said casing to rotate the shaft, a radial arm connected to the tubular shaft for turning the same, releasable clutch mechanism between the said arm and stem for constraining the stem to turn the tubular shaft, the outer casing having an outlet for the mixture at its inner end, and means in connection with the casings for thoroughly mixing the same.

3. A carbureter, comprising concentric inner and outer casings, the outer casing supporting a valve seat having an aspirating well at the lower end of the said casing, and the inner casing being adapted to fit against the seat to close the said inner casing, a valve for closing the aspirating well and having a stem extending beyond the inner end of the casing, said casing having a threaded engagement for constraining one of them to move longitudinally with respect to the other when the inner casing is turned in either direction, means for rotating the inner casing, and a releasable connection between the said means and the valve stem for constraining the valve stem to move with the said rotating means.

HERBERT W. ALLEN.

Witnesses:
G. H. SNYDER,
W. G. STUBBS.